T. J. McGRATH.
PACKING.
APPLICATION FILED NOV. 13, 1919.
1,383,001.
Patented June 28, 1921.
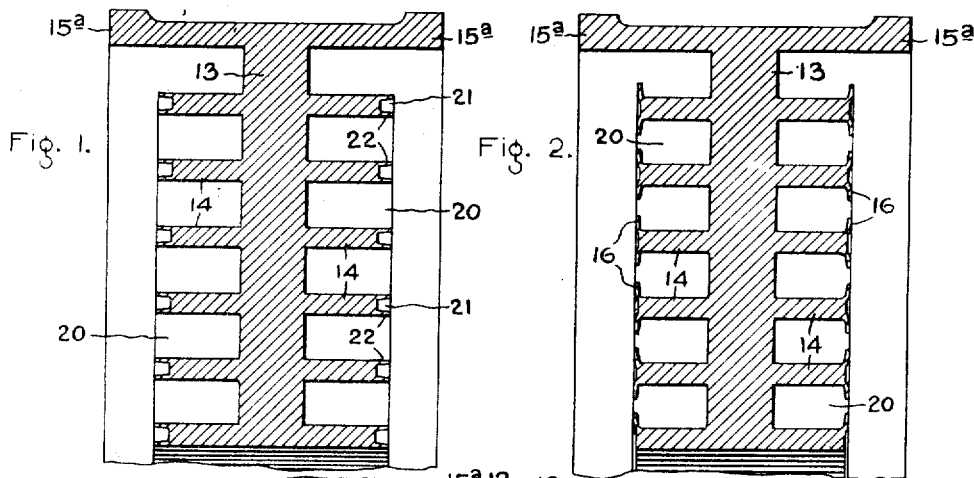
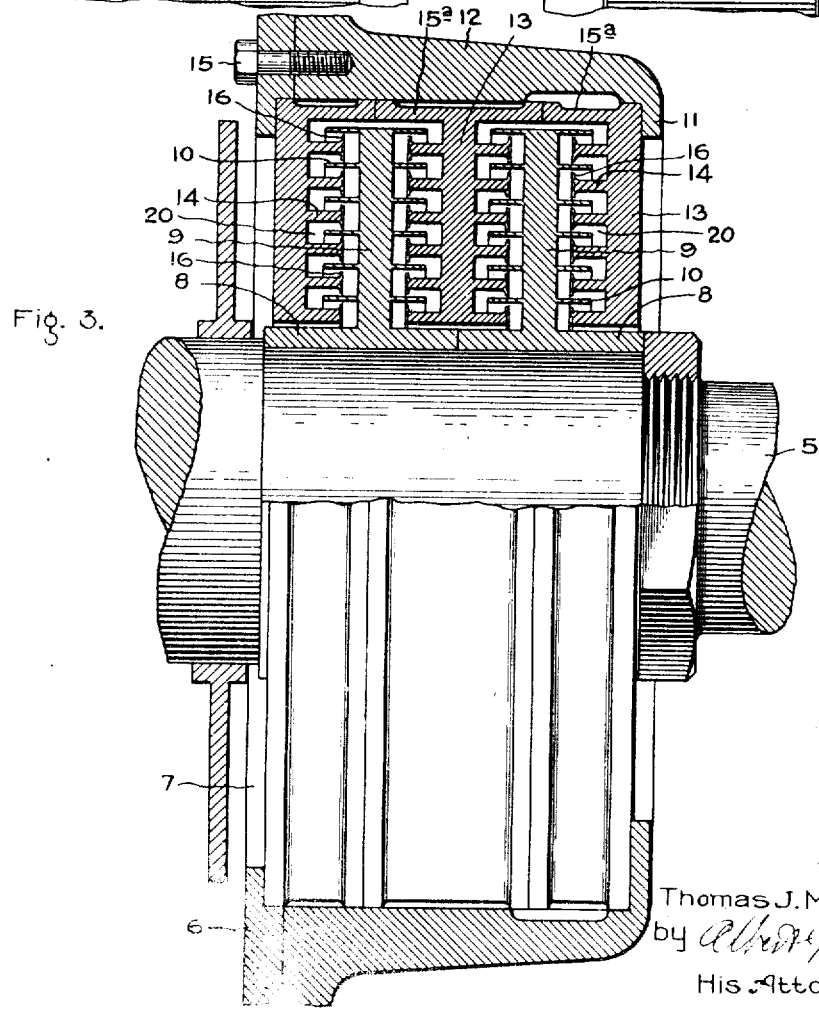
Inventor,
Thomas J. McGrath,
by Albert G. Davis
His Attorney.

UNITED STATES PATENT OFFICE.

THOMAS J. McGRATH, OF SCHENECTADY, NEW YORK, ASSIGNOR TO GENERAL ELECTRIC COMPANY, A CORPORATION OF NEW YORK.

PACKING.

1,383,001.   Specification of Letters Patent.   Patented June 28, 1921.

Application filed November 13, 1919. Serial No. 337,804.

*To all whom it may concern:*

Be it known that I, THOMAS J. MCGRATH, a citizen of the United States, residing at Schenectady, county of Schenectady, State of New York, have invented certain new and useful Improvements in Packings, of which the following is a specification.

The present invention relates to packings of the labyrinth type comprising a plurality of axially extending, interleaving rings, some of which carry radially extending, annular projections which pack against the surfaces of adjacent rings thereby forming a tortuous passage to baffle the flow of fluid, the leakage of which it is desired to prevent.

The object of my invention is to provide an improved method for making a packing element for use in a packing of the above referred to type, and for a consideration of what I believe to be novel and my invention, attention is directed to the accompanying description and the claims appended thereto.

In the drawing, Figures 1 and 2 are views illustrating successive steps in the formation of a packing element, and Fig. 3 shows a complete packing made in accordance with my invention.

Referring first to Fig. 3, 5 indicates a rotating shaft which may be, for example, a shaft of an elastic-fluid turbine, and 6 indicates a wall having an opening 7 through which the shaft projects and between which and the shaft it is desired to prevent leakage. Wall 6 may be, for example, a part of a turbine casing. Carried by shaft 5 are one or more sleeves 8 having axially spaced collars 9 thereon from which project concentric radially spaced axially extending rings 10.

Clamped between casing wall 6 and an inturned flange 11 on the outer end of a housing 12 are a number of packing elements each comprising a disk 13 located in a plane at right angles to the shaft and provided at either one or both sides with axially projecting concentric rings 14 which interleave with rings 10. Housing 12 is fastened to wall 6 by suitable bolts 15 and disks 13 are spaced apart by means of flanges 15ª which may be formed integral with disks 13. Carried by the outer edges of rings 14 and projecting on each side thereof are thin packing strips 16. The edges of strips 16 terminate close to the surfaces of rings 10 and pack against them. Strips 16 are made very thin and present sharp edges to the surfaces of rings 10.

A packing as described above and shown in Fig. 3 is of known type and my invention has to do particularly with the method of making the packing elements which comprise the concentric rings 14 with the strips 16 projecting from the edges thereof. In this connection it is pointed out that it is essential that strips 16 be accurately concentric and that they present very thin edges to the surfaces against which they pack. A packing of this type may be made of any desired length by multiplying the number of packing elements used, as is obvious.

According to my invention, I take a suitable piece of stock in the form of a disk (Fig. 1) and cut annular slots or grooves 20 in either one or both of its surfaces to form the projecting concentric radially spaced rings 14 and the disk 13 which carries them. If there are to be rings 14 on both sides of disk 13 then grooves 20 are cut on both sides as shown in Fig. 1. If, however, there are to be rings 14 on only one side then grooves 20 are cut on only one side. It will be clear that grooves 20 can all be machined with a single setting of a piece of stock and that rings 14 will be accurately spaced and perfectly concentric.

Either at the same time grooves 20 are being cut or after they have been cut I cut shallow grooves 21 in the edges of rings 14 so as to provide two spaced parts 22 which are thin and sharp at their outer edges. After all the grooves 20 and 21 have been cut the original piece of stock has the appearance as shown in Fig. 1. A spacing flange 15 is shown as being formed integral with the periphery of disk 13. Parts 22 are now turned outwardly by means of a suitable tool so they project at or substantially at right angles to rings 14 thereby forming the projecting packing strips 16 referred to in connection with Fig. 3. This then forms a complete packing element comprising disk 13 with annular projecting rings 14 carried thereby and having at their edges the concentric packing strips 16. As will be clear, all the operations in making the packing element can be carried out with a single setting of the piece of material from which the element is to be formed so that it need be centered but once. This means that the grooves 20 and 21 will form rings 14 and parts 22 which are accurately concentric and that when parts 22 are turned as shown in Fig. 2 to form the packing strips 16, they will be accurately concentric so as to pack correctly against the surfaces of rings 10. It will also be clear that collar 9 and the rings 10 carried thereby may be formed from a solid piece of stock having concentric grooves cut in its side face or faces so as to provide rings 10.

By following my improved method of manufacture, the strips 16 can readily be made as thin as found desirable and their edges can be made sharp. Furthermore, should at any time some of the strips 16 in the packing element become damaged, it is a comparatively simple matter to machine the damaged strip away and thereafter fasten a suitable strip to the ends of the ring or rings 14 in any of the ways which are now known and in use.

What I claim as new and desire to secure by Letters Patent of the United States, is:—

1. The method of making a packing element which comprises taking a member having spaced projecting concentric rings thereon, machining grooves in the edges of said rings to form projecting parts, and then turning the said parts outwardly in opposite directions and at an angle to said rings.

2. The method of making a packing element which comprises taking a disk and machining spaced grooves in the surfaces of it to form spaced concentric rings, machining grooves in the ends of said rings to form thin, annular projecting parts at such ends, and turning said parts to an angle with the rings to form annular projecting packing strips.

3. The method of making a packing element which comprises taking a block of material, forming spaced annular concentric grooves in both side surfaces thereof to form concentric rings, machining grooves in the edges of said rings to form thin, annular projecting parts, and turning said parts so they extend at an angle to said rings to form packing strips.

In witness whereof, I have hereunto set my hand this 12th day of November, 1919.

THOMAS J. McGRATH.